Aug. 24, 1937.  S. G. BOLIN  2,090,933
DEVICE FOR POSITIONING DENTAL X-RAY FILM
Filed May 5, 1933  2 Sheets-Sheet 1
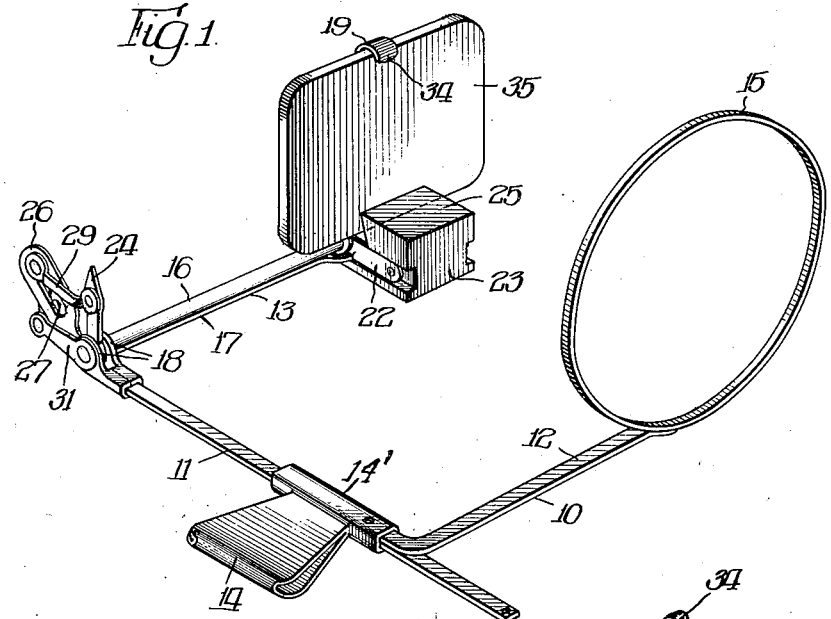
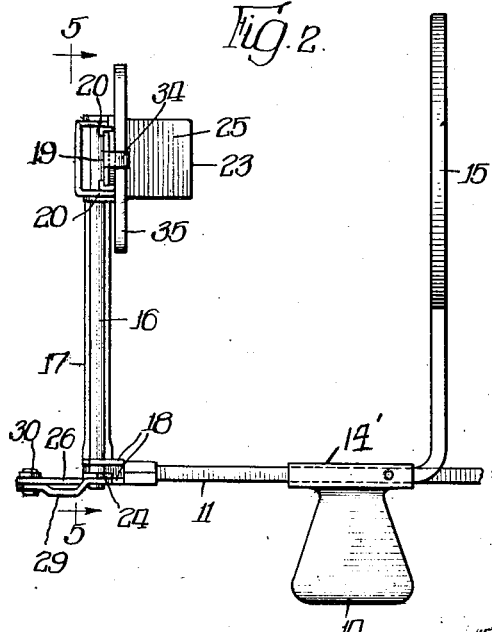
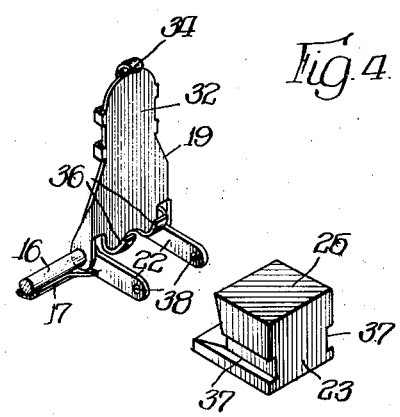
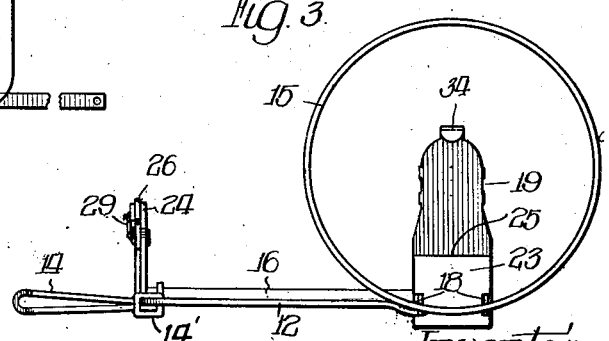
Inventor:
Stanley G. Bolin,

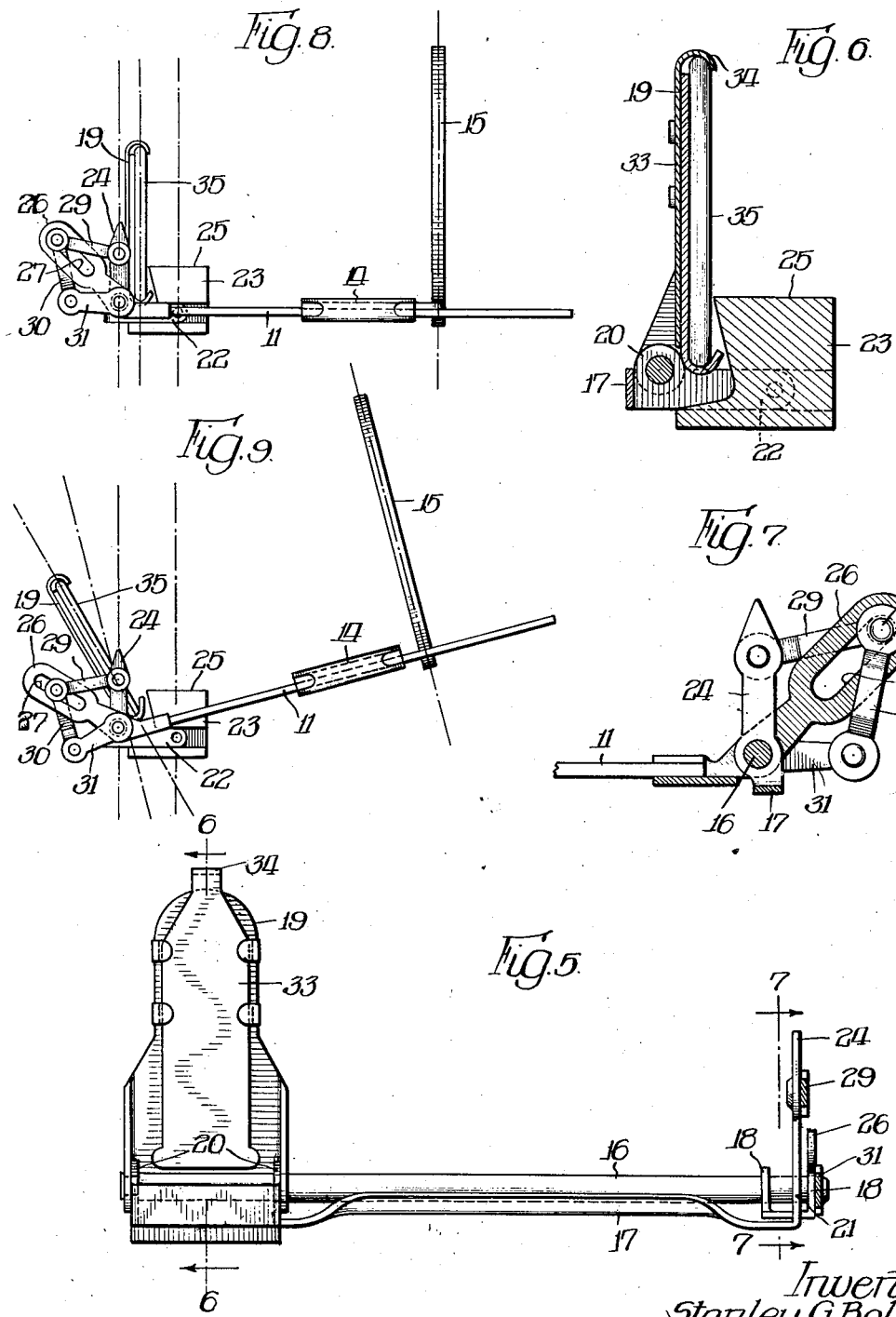

Patented Aug. 24, 1937

2,090,933

UNITED STATES PATENT OFFICE 2,090,933

DEVICE FOR POSITIONING DENTAL X-RAY FILMS

Stanley G. Bolin, Chicago, Ill., assignor of one-half to Leonard M. Bolin, Chicago, Ill.

Application May 5, 1933, Serial No. 669,570

5 Claims. (Cl. 250—34)

This invention relates to dental radiography, and is particularly concerned with the means employed for supporting the X-ray film in the patient's mouth.

The principal object of the invention is to provide a device which holds the film in proper relation to the tooth and automatically indicates the correct angle for the X-ray cone. The device can be used in any type of mouth; accommodates any standard intra-oral film; may be easily sterilized; insures a correct centering of the X-ray tube with respect to the film; and gives an accurate bisection of the angle between the tooth and the film.

Other more specific objects and advantages may be evident to those skilled in the art upon a full understanding of the construction of the device and the manner in which it functions in use.

One form of the invention is presented herein for the purpose of exemplification, but it will of course be appreciated that the invention may be embodied in other structurally modified forms coming equally within the scope of the appended claims.

In the accompanying drawings:

Fig. 1 is a perspective view of the device;

Fig. 2 is a plan view;

Fig. 3 is a front view;

Fig. 4 is a perspective view of the film holder and bite block, showing the way in which the latter may be removed;

Fig. 5 is an enlarged rear view of the device, with portions sectioned on the line 5—5 of Fig. 2;

Fig. 6 is a vertical section through the film holder and bite block, taken on the line 6—6 of Fig. 5;

Fig. 7 is a vertical section through the angle adjusting linkage, taken on the line 7—7 of Fig. 5;

Fig. 8 is a side view of the device, showing the same with the ring parallel with the film; and Fig. 9 is a similar view, showing the film tilted back and the ring bisecting the angle between the film and the tooth.

The device which forms the subject matter of this invention is similar in some respects to the device which is shown in my earlier application Serial No. 536,041. As will be observed in the drawings, the device includes a generally U-shaped frame 10 which is provided with an extensible base 11 for permitting the distance between the sides 12 and 13 to be readily varied. A small flat outwardly projecting finger piece 14 is secured to one of the sections of the base 11 for use in positioning the device in the patient's mouth. The finger piece has a tubular portion 14' which is sleeved over the overlapping sections of the frame members and serves to hold the latter frictionally against inadvertent extension or contraction. A ring 15 is fixedly mounted on the end of the side 12, in upstanding tangential relation thereto. The other side 13 of the frame is composed of a rod 16 and a narrow strip 17 which are arranged alongside each other and are independently rotatable about the same axis. One end of the rod 16 is journaled in a pair of apertured bearing ears 18 which are formed on the adjacent end of the base 11, and a film holder 19 is fixedly mounted on the other end of the rod. The strip 17—which is substantially coextensive with the rod 16—is provided at one end with a pair of apertured bearing ears 20 and at the other end with an apertured bearing ear 21, which ears are all journaled on the ends of the rod 16. The ears 20 are provided with extensions 22 between which a bite block 23 is detachably mounted, and the ear 21 on the other end of the strip is provided with an extension 24 in the shape of a small arrow which points at all times in a direction perpendicular to the bite surface 25 of the block, which direction corresponds to the long axis of a tooth when the same is clamped squarely down on the block.

The end of the base 11 which supports the rotatable rod 16 and the rotatable strip 17 is provided with an extension 26 which projects at an angle of 45 degrees and contains a slot 27 which is elongated in the same direction. The slot 27 forms a guideway for a small pivot pin 28 which connects together the ends of two links 29 and 30. The other end of the link 29 is pivoted to the upper end of the extension 24 on the adjacent end of the strip 17, while the other end of the link 30 is pivoted to the outer end of an arm 31 which is secured to the adjacent end of the rod 16 in a position at right angles to the plane of the film holder 19.

The film holder 19 consists of a backing plate 32 and a slide plate 33 which is mounted for vertical adjustment at the back of the plate 32 and terminates at its upper end in a curved tongue 34. When a film 35 is positioned in the holder 19, the lower edge of the film seats in a pair of upwardly curved tongues 36 at the bottom of the plate 32 and the upper edge of the film is engaged by the tongue 34 on the slide 33, the latter being pushed downwardly far enough to cause the tongue 34 to securely grip the film.

The bite block 23, which is preferably made of wood, is provided at its opposite sides with grooves 37 which are adapted to accommodate the extensions 22 on the end of the strip 17. The extremities of the extensions 22 are provided with small bosses 38 which frictionally engage with the block to prevent inadvertent removal thereof.

When the device is to be used, the sterilized bite block 23 is sprung into position between the extensions 22 and an unexposed film is placed in the holder 19 behind the bite block. The side 13 of the frame 10, carrying the bite block and the film, is then inserted in the patient's mouth, with the film behind the tooth which is to be X-rayed, and the tooth is caused to be brought down against the upper surface 25 of the block in tightly clamped engagement with the latter. In this position, the long axis of the tooth will ordinarily be perpendicular to the surface 25 of the block and the film 35 in its holder will be canted back away from the tooth at an angle. As the film holder, with its contained film, is tilted back, the linkage 29 and 30 will act through the pivot pin 28 to keep the extension 26 in a position midway between the extension 24 and the arm 31 which positioning of the extension 26 will obviously cause the ring 15 to be tilted up into a position wherein it will be parallel to a plane which bisects the angle between the long axis of the tooth and the film. The ring 15 automatically assumes this bisected position, and it is only necessary for the operator to check to see that the arrow 24 is in line with the long axis of the tooth. By then moving the X-ray cone into a position in register with the ring 15, an exposure can be made with assurance that the X-ray will be correctly centered with respect to the film and that an accurate bisection has been made of the angle between the tooth and the film.

This application is a continuation-in-part of my earlier application Serial No. 536,041, filed May 8, 1931.

I claim:

1. In a device of the character described, a bite block, a film holder which is movable relative to the block, a sighting element which is also movable relative to the block, and a motion transmitting connection between the sighting element, holder and block actuated by relative movement between the holder and block for causing said element to automatically assume a sighting position which bisects whatever angle is present between the holder and a tooth clamped down squarely on the block.

2. In a device of the character described, a generally U-shaped frame, a bite block pivotally associated with the frame at one end of the latter, a film holder pivotally associated with the frame at the same end in a position behind the block, a sighting ring fixedly mounted on the other end of the frame in opposition to the block and holder, and a motion transmitting connection between the ring, holder and block actuated by relative movement between the holder and block for causing the ring to automatically assume a sighting position which bisects whatever angle is present between the holder and a tooth clamped down squarely on the block.

3. In a device of the character described, a bite block, a film holder which is movable relative to the block, a sighting element which is also movable relative to the block, a motion transmitting connection between the sighting element, holder and block actuated by relative movement between the holder and block for causing said element to automatically assume a sighting position which bisects whatever angle is present between the holder and a tooth clamped down squarely on the block, and an exposed indicator which points at all times in a direction perpendicular to the bite surface of the block.

4. A device of the character described, which is adapted to be supported by the patient independently of the X-ray machine for holding a film in the patient's mouth and for indicating the position of the film therein, comprising a U-shaped frame, a film holder on one end of the frame, a bite block on the same end as the holder in hinged relation to the latter, and a directing member on the other end of the frame in opposition to the holder.

5. A device of the character described, which is adapted to be supported by the patient independently of the X-ray machine for holding a film in the patient's mouth and for indicating the position of the film therein, comprising a U-shaped frame, a film holder on one end of the frame, a bite block on the same end as the holder, and a directing member on the other end of the frame in opposition to the holder, said bite block being movable angularly relative to the frame and also relative to the holder.

STANLEY G. BOLIN.